US006284303B1

(12) United States Patent
Rowe et al.

(10) Patent No.: US 6,284,303 B1
(45) Date of Patent: Sep. 4, 2001

(54) VEGETABLE BASED CREAMY FOOD AND PROCESS THEREFOR

(75) Inventors: Ellen Harkabus Rowe, Bayonne; Frank Liedl, Bridgewater; Krystyna U. Tancibok, Union, all of NJ (US)

(73) Assignee: Bestfoods, Englewood Cliffs, NJ (US)

( * ) Notice: Subject to any disclaimer, the term of this patent is extended or adjusted under 35 U.S.C. 154(b) by 0 days.

(21) Appl. No.: 09/209,503

(22) Filed: Dec. 10, 1998

(51) Int. Cl.⁷ ..................................................... A23L 1/214
(52) U.S. Cl. ............................................................... 426/628
(58) Field of Search .................................. 426/589, 615, 426/628, 629, 637, 638, 650

(56) References Cited

U.S. PATENT DOCUMENTS

| 436,686 | 9/1890 | Bartel | 426/615 |
|---|---|---|---|
| 2,941,889 | * 6/1960 | Welch | 426/628 |
| 4,264,238 | 4/1981 | Taga et al. | 426/640 |
| 4,273,790 | 6/1981 | Bosco et al. | 426/335 |
| 4,273,795 | 6/1981 | Bosco et al. | 426/602 |
| 4,496,603 | 1/1985 | Manabe et al. | 426/577 |
| 4,596,714 | * 6/1986 | Brabbs | 426/297 |
| 5,503,863 | 4/1996 | Brain et al. | |
| 5,693,357 | * 12/1997 | Wong et al. | 426/633 |
| 5,789,012 | * 8/1998 | Slimak | 426/629 |
| 6,090,428 | * 7/2000 | Nestelle | 426/538 |

FOREIGN PATENT DOCUMENTS

| 0 738 472 A | 10/1996 | (EP) . |
| 0 835 614 A | 7/1998 | (EP) . |
| 2 674 103 A | 9/1992 | (FR) . |
| 2 257 345 A | 1/1993 | (GB) . |

OTHER PUBLICATIONS

H. O'Connor, "Pie Cook Book", Arco Publishing, p. 87, Jan. 1953.*

Rombauer et al. "Joy of Cooking", Bobs–Merrill Co., p. 185, Jan. 1975.*

Kraft: Philadelphia Brand Cream Cheese Cookbook, Crown Publishers, Inc., pp. 188–189, Jan. 1988.*

Larousse Gastronomique XP002133150—pp. 1022–1023, (Jan. 1990).

Patent Abstracts of Japan, vol. 009, No. 180, JP 60 049774 A, Jul. 25, 1985.

Patent Abstracts of Japan, vol. 005, No. 102, (C–061), JP 56 042563, Jul. 2, 1981.

Patent Abstracts of Japan, vol. 015, No. 167, (C–087), JP 03 035773, Feb. 15, 1991.

Patent Abstracts of Japan, vol. 016, No. 001, (C–0899), JP 03 228659, Oct. 9, 1991.

Patent Abstracts of Japan, vol. 1995, No. 11, JP 07 194349 A, Dec. 26, 1995.

Patent Abstracts of Japan, vol. 1996, No. 02, JP 07 265023 A, Feb. 29, 1996.

Derwent Publications Ltd., Section Ch, Week, Apr. 1994, AN 1994–032784, XP 002133151.

SU 1 785 426 A, Dec. 30, 1992.

* cited by examiner

*Primary Examiner*—Keith Hendricks
(74) *Attorney, Agent, or Firm*—Ellen Plotkin

(57) ABSTRACT

A creamy food comprising pumpkin vegetable matter as the main texture and mouthfeel imparting component. The creamy food comprises up to 78 percent pumpkin vegetable matter, 1–15% oil, and 0–5% starch. Pumpkin is the preferred vegetable due to its non-gritty texture and bland flavor capable of assuming other desired flavors. The product has a wide range of applications due to its texture, mouthfeel, and stability. It can be flavored and colored as desired, and provides a rich-tasting product of superior texture while being low in fat and/or calories and nutritionally rich. According to a preferred aspect of the process, components are added in a special order and processed using means for allowing water to be released from the vegetable matter.

9 Claims, No Drawings

VEGETABLE BASED CREAMY FOOD AND PROCESS THEREFOR

FIELD OF INVENTION

The present invention relates to a vegetable based creamy food formulation and process. More particularly, it relates to a formulation of a universal creamy food, such as a condiment, utilizing vegetable matter, such as, for example, pumpkin, as a base.

BACKGROUND

In recent years, consumer trends show concern over health issues, such as fat content, etc., and a decrease in home preparation/consumption of meals utilizing high fat foods, such as condiments of the mayonnaise type.

Commercially available creamy foods, such as spreads, condiments, and the like, are formulated with combinations of oil, eggs, starches, gums, vinegar, etc. to provide for creamy texture, pleasant flavor and mouthfeel. Bosco et al., U.S. Pat. Nos. 4,273,790 and 4,273,795 disclose low-fat spreads which may use small amounts of pumpkin as an optional flavoring ingredient. However, no commercially available, and especially no shelf-stable, condiments formulated with vegetable matter as the main component, which is responsible for the product texture and mouthfeel are known to exist. For example, no creamy food using, specifically, pumpkin base, is known to exist commercially.

Therefore, there is a need for commercially available creamy foods using vegetable matter as a base, which is both low in fat and high in vitamins, all important parts of a healthy diet. For example, a vegetable based condiment as an alternative to conventional mayonnaise and other high fat spreads would be well accepted by the health conscious consumer. Moreover, a vegetable based creamy food that is texturally and organoleptically comparable to its conventional counterparts would be welcomed by consumers.

More specifically, there is a need for a commercially available creamy condiment, which uses vegetable matter as the main component, due to its low-fat and nutritionally rich qualities.

Accordingly, it is an object of the present invention is to provide a universal creamy food using vegetable matter as the main component imparting textural and organoleptic characteristics to the food.

Another object of the present invention is for the creamy food to be capable of being stored in fresh, refrigerated, frozen, or shelf-stable form.

Another object of the present invention is to provide a universal condiment spread utilizing vegetable matter, including but not limited to, pumpkin, squash, zucchini, tomato, potato, and beans as the primary ingredient.

Another object of the present invention is to provide a product with similar functionality of a creamy food, such as a condiment, but with nutritional benefits not currently available.

Another object of the present invention is to provide a condiment spread which is creamy and spreadable.

A further object of the present invention is to provide a low-fat and nutritionally rich vegetable base for a variety of food applications.

Other objects and features of the present invention will become apparent to one skilled in the relevant art by reference to the specification.

In the present specification and claims, all parts and percentages are by weight, unless otherwise specified.

SUMMARY OF THE INVENTION

These and other objects are achieved according to the present invention, which provides a vegetable based creamy food and a process for its production. The vegetable matter, which may be used in natural form, as puree, or as powder, is used as the main texture and mouthfeel imparting component. Vegetables such as pumpkin, squash, beans, zucchini, tomato, and potato may be used. The vegetable matter is preferably present in amounts of up to 78 weight %. The creamy food may further comprise oil and stabilizers and is suitable for storage in refrigerated, frozen, and shelf-stable form. Condiments, spreads, dips, dressings, sauces, marinades, vegetable toppings, pates, fillings for baked goods, beverages, soups, and soup enhancers are included among the creamy foods contemplated by the present invention.

Preferably, the creamy food is a universal pumpkin based creamy condiment, which in its broad aspects comprises pumpkin, oils, and stabilizers. The composition may further include one or more other vegetables such as squash, cucumber, zucchini, pepper, tomato, potato, beans, onions, and lettuce.

The process for producing a pumpkin based condiment comprises combining vegetable matter, fats, and stabilizers using means for allowing water to be released from the vegetables so as to evenly hydrate these and additional components. The process can be carried out in a kettle, colloid mill, press, or homogenizer and is preferably performed in a kettle with continuous recirculation.

DETAILED DESCRIPTION OF INVENTION

The vegetable based creamy food of the present invention is a product, prepared by the process of the present invention, which is made from main ingredients which are low or non-fat and nutritious. Creamy foods of the present invention include, but are not limited to, a wide variety of condiments, spreads, dips, dressings, sauces, marinades, vegetable toppings, pates, fillings for baked goods, beverages, soups, soup enhancers and bases or ingredients for a wide variety of other foods. Moreover, the invention enables the production of a wide variety of novel spreads and other creamy food products, which are not simulations of known products. The creamy foods of the present invention are intended to be made available commercially, and thus to be commercially processed. Surprisingly, it has been found that a condiment containing vegetable matter provides a healthier alternative without compromising functionality. Vegetable matter, as used herein, is intended to encompass vegetable matter including, but not limited to, pumpkin, squash, cucumber, zucchini, pepper, tomato, potato, onions, lettuce, and beans, including all varieties of these vegetables.

Various vegetables were evaluated for their smooth texture, creamy mouthfeel, ability to be flavored, and nutrition contributions. Vegetables including pumpkin, squashes of all types, including winter squash and butternut squash, cucumbers, zucchini, beans, white potatoes and sweet potatoes, as well as tomatoes were found to be acceptable for use as a base for creamy foods and suitable for imparting their texture to the food. These vegetables may be used individually or in combination with other vegetables. The vegetable matter may be used in fresh, retorted, or dehydrated form. The use of vegetable matter as the primary ingredient in combination with a low oil and starch content provides for a unique creamy texture and pleasant mouthfeel while providing positive nutrition.

The fat will preferably be present in amounts within the range of from about 0 to 40 percent based on the weight of the final product, such as a spread, and most preferably in an amount of from 10 to 20 percent of the weight of the spread. The term "fat" as used herein is intended to include all edible, fatty acid triglycerides regardless of origin or whether they are solid or liquid at room temperature. Typical of the vegetable oils, which are included, are the usual vegetable oils such as soybean oil, corn oil, cottonseed oil, peanut oil, safflower oil, sunflower oil, palm oil, and rapeseed oil. The preferred fats for use in the invention will comprise soybean oil, olive oil, corn oil, and butter. Most preferred fats are soybean oil and olive oil. The oils provide lubricity to the composition and keep the total moisture content low, which helps control or balance the acid and salt effects on microstability.

The use of stabilizers is essential to provide the necessary texture. These can be any of those known to the art for this purpose and will preferably be starches, gums, polysorbate 60 (an emulsifier), and the like and mixtures of these. Rice starch is the preferred starch, which acts as a binder and thickener. Examples of gums that may be used are xanthan gum and carageenan, which serve as thickeners. The stabilizer can be employed in any amount effective under the conditions of processing and with the particular ingredients. It has been found, however, that levels of about 0 to 5 percent starch, preferably 1 to 3 % starch, and 0 to 0.5 percent gums, preferably up to 0.3 % gums, based on the weight of the total composition, are particularly effective. In addition to their emulsion stabilizing function, these materials also have a viscosity-increasing effect on the composition. Typically, the gums will be dissolved or dispersed in the oil or the water phase to avoid clumping.

The preferred products of the invention will be suitably colored and flavored with those materials known to the art for these purposes. An example of a coloring or opacifying agent is titanium dioxide ($TiO_2$), but other coloring agents may also be used. Coloring compounds such as beta carotene are naturally present in pumpkin. Typically, the coloring compounds will be dissolved or dispersed in the oil or the water phase to expedite blending. Otherwise, the titanium dioxide will form clumps. Representative of the flavors and/or flavor enhancers will be sodium chloride, spices, herbs, and natural and synthetic flavors, as well as vegetable matter itself.

In addition, the products of the invention are preferably stable against microbiological and oxidative deterioration. To control mold and bacteria growth, the products contain one or more preservatives or mold inhibitors such as sodium benzoate, potassium sorbate, and other like materials. EDTA is an antioxidant and chellating agent, which binds metals so they do not promote oxidation. The pH of the aqueous phase is preferably maintained at a value below 4, and more preferably within the range of 3 to 3.5, to provide effective microbial control and good flavor with the lowest necessary levels of preservatives. Citric acid and vinegar may be added to the formulation for both their preservative effects (pH lowering) and flavor characteristics.

Also added can be any of the vitamins and minerals desired or which are normally associated with the vegetable matter, such as vitamins A, C, D, E, and Iron.

Surprisingly, pumpkin was identified as a superior and preferred vegetable due to its unique non-gritty, pulpy texture, relatively bland flavor, and positive nutrition. The bland flavor of pumpkin blends with many other flavorful ingredients, producing a variety of flavors, which are as versatile as current condiments or other creamy foods. Pumpkin is high in Vitamin A and its substitution for fat or oil yields a creamy food that is relatively low in fat. Pumpkin in any form, such as fresh pumpkin, puree pumpkin, or dried pumpkin is suitable for use according to the present invention. Pumpkin puree is readily available in retorted, canned form. With up to 78% pumpkin, in combination with starch, preferably at 1–2%, and oil, preferably 1–15%, the texture of a pumpkin base for creamy foods becomes light and spreadable with a smooth mouthfeel. Increasing the amount of pumpkin above 78% is not believed to be advantageous because the pumpkin flavor becomes too strong and the pumpkin color becomes more difficult to mask with colorants such as $TiO_2$.

The vegetable based creamy food of the present invention may be prepared to be suitable for storage in refrigerated, frozen, or shelf-stable form.

The following are processing considerations for preparing the vegetable based creamy food of the present invention. The goal is to mix all the ingredients to come up with a uniform product of acceptable texture. In working to this end, certain challenges arise. Dispersability is a factor. If all ingredients are simply mixed together, the product will resemble a dough.

The following are solutions that have been discovered unexpectedly.

Release water from vegetables—important for obtaining suitable texture. This is accomplished by recirculating the composition in a kettle to release as much water as possible from fresh or pureed vegetables (decrease amount of bound water). The best mode contemplated by the inventors for achieving water release is by use of a high shear mixer with continuous recirculation, due its simplicity. Colloid mill, press, homogenizer, and similar means may also be used for release of water from vegetables.

Add vegetables and liquids among the first components in the mixture.

As an alternative, use dry vegetables with addition of water, to avoid having to release water. For example, dehydrated pumpkin, available from Pierre Cagne, was found to produce results comparable to use of retorted pumpkin when rehydrated to the same overall moisture content.

Order of addition can be critical. Vegetable matter can all be blended together. Half of the oil is added half way through the process to loosen the mass and provide some lubricity. Oil is always added slowly in order to promote the formation of a stable emulsion and even blending. Certain dry ingredients should be added before other dry ingredients. Spices and other dry ingredients should be dry blended with starch to avoid lumps. Dry starch should be added before sugar.

Gums need to be hydrated separately.

Titanium dioxide is best added when dispersed in oil.

Vinegar and salt should be added after the starches and gums are fully hydrated.

In any method, care must be taken to minimize air incorporation to better control texture and density. However, as a variation, the products of the present invention can be aerated to provide fluffiness or smoothness to the overall texture. This may be accomplished by sparging the product with nitrogen, for example.

The following are by way of example and are not meant to be limiting in any way.

EXAMPLE 1

Vegetable Based Condiment Products

In this example, vegetables such as pumpkin, green pepper, pimiento, and tomato paste are used for their functionality of providing flavor and solids to a condiment formulation in order to impart to it the desirable textural and organoleptic qualities. Lettuce juice provides moisture, flavor, vitamins C and A and qualifies as vegetable matter for purposes of the present invention.

The following vegetable matter based condiment formulations were prepared for testing by a consumer panel.

| | Percent in Formula | |
|---|---|---|
| Ingredients | Formulation A "Southwest Fiesta" | Formulation B "Garden Blend" |
| Liquid Soybean Oil | 10.00 | 13.500 |
| Xanthan Gum | 0.370 | 0.370 |
| Carrageenan Gum | 0.110 | 0.110 |
| Vinegar | 4.500 | 4.500 |
| Rice Starch | 2.000 | 2.000 |
| Salt (NaCl) | 2.000 | 2.000 |
| Lemon Juice Concentrate | 0.#60 | 0.160 |
| Sodium Benzoate | 0.100 | 0.100 |
| P-60 Emulsifier, available From Ruger Chem Under TWEEN 60 brand | 0.270 | 0.270 |
| $TiO_2$, dry | 1.500 | 1.500 |
| Black Pepper, ground | 0.060 | 0.040 |
| Onion Powder | 2.430 | 3.000 |
| Garlic Powder | 0.#73 | 0.830 |
| EDTA, available from Ciba-Geigy | 0.010 | 0.0#o |
| Red Bell Pepper Puree | 5.00o | 5.00o |
| Lettuce Juice | 5.00o | |
| Water, deionized | #0.640 | |
| Roast Flavor, available from Hasegawa | 0.750 | |
| Sugar, fine granulated | 13.000 | 8.000 |
| Tomato Paste, 26% solids | 9.360 | 8.000 |
| Chili Powder, dark | 1.440 | |
| Pimiento Puree | 9.000 | |
| Green Pepper Puree | 8.000 | |
| Pumpkin | 24.000 | 35.000 |
| Cilantro Spice Cap, available From McCormick | 0.020 | |
| Cumin Spice Cap, available From McCormick | 0.028 | |
| Coriander Seed, ground | 0.017 | |
| Basil Spice Cap, available From McCormick | 0.009 | |
| Celery Seed, Spice Cap, available From McCormick | 0.009 | |
| Nutmeg, Spice Cap, available From McCormick | 0.013 | |
| Red Pepper Spice Cap, available From McCormick | 0.005 | |
| Oregano, Mexican, ground | 0.025 | |
| Clove Spice Cap, available From McCormick | | 0.080 |
| Ginger Spice Cap, available From McCormick | | 0.090 |
| Corn Syrup 42DE, available From CASCO | 0.642 | 4.800 |

General Procedure for Preparation of Spreads:
1. All pureed or diced vegetables and liquids were placed in a mixing vessel.
2. While mixing, the preservatives were added slowly and allowed to dissolve.
3. Starch, spices, and flavors were added slowly and under mixing. These dry ingredients were allowed to hydrate completely.
4. Sugar and corn syrup were added.
5. One third of the oil was combined with gums, emulsifier and $TiO_2$. The oil mixture was heated to 120° F., stirred and added slowly to the mixing vessel.
6. The rest of the oil was added and allowed to emulsify for about 3 minutes.
7. Vinegar was added and mixing was continued for about 1 minute.
8. Salt was added and mixing was continued for about 1 minute.
9. The resulting product was prepared for use or for storage by refrigeration or other suitable means.

Formulation A, Southwest Fiesta condiment, and Formulation B, Garden Blend condiment, were tested by consumers. The results of consumer tests were compared with a MarketFacts Food Norm. This Food Norm was established based on a home use test of 42 different food products of 3 different companies. The analysis showed these products to be significantly superior to Food Norms. When these pumpkin and vegetable based formulations were tested for texture or thickness, consumers found it to be "just right" for a condiment. Taste and appearance were rated as "very good," the products were liked "very well," and the overall products were found to be "unique" or "very unique."

EXAMPLE 2

Marinade

This example demonstrates the advantageous use of formulations of the present invention as marinades.
Procedure:

Formulation B of Example 1, Garden Blend, was mixed in equal parts with vinegar. Chunks of chicken were placed in the marinade in a glass container and allowed to marinate overnight. After cooking, good flavor penetration into the meat was observed. The marinate adhered to the chicken during broiling and did not brown.

EXAMPLE 3

Process for Producing a Garden Blend Condiment

A 200 pound batch of a Garden Blend condiment was prepared according to the formulation of Example 1B and the process and its variations 3a–3d of this Example.

3a.

A kettle with a 14 inch marine propeller was used. The pump used for recirculation was a Waukeshaw Model DO 30 set for maximum speed.

Red bell pepper puree and corn syrup were charged to the kettle. Recirculation was started at low speed.

One half of the formula water was added, followed by tomato paste and pumpkin puree. The propeller speed was increased to medium, at approximately half the maximum speed.

Lemon juice, EDTA, and sodium benzoate were charged to the kettle. Rice starch was added. It is important to hydrate the rice starch with the formula water and the free water that is released from the vegetables. The propeller speed was increased to the maximum propeller setting. As the composition is mixed, water is released from the vegetable matter and is used to hydrate the other ingredients.

Onion powder is added, followed by the remaining half of the water. Water is added in two steps because, initially, it is important to have enough liquid for slip, while maintaining enough dense mass to squeeze liquid out of the vegetable matter. It is critical that the remaining half of the water not be added earlier than this step, although it is not critical how much later it is added in order to bring the mixture to acceptable consistency.

$TiO_2$ is dispersed in half the formula oil and added to the kettle, followed by addition of the remaining half of the oil.

Sugar is critically added after the starch is fully gelatinized or hydrated.

Typically, the gums will be dissolved or dispersed in the oil or the water phase prior to addition to the rest of the mixture in order to avoid clumping.

Vinegar is added.

Salt is added toward the end to avoid interfering with hydration of the gums.

Following addition of all ingredients, the composition is mixed and recirculated for 6 to 15 minutes or until all ingredients are uniformly dispersed. Preferably, this processing takes place for 10 minutes if no colloid mill is involved in the process, or for 6 to 7 minutes if a colloid mill is employed.

The product prepared in accordance with this Example was found to be acceptable when tested by consumers.

3b.

As a variation on this experiment, after the addition of vinegar and salt, the composition was put through a colloid mill. The gap, or the space between the rotor and stator, and the throughput rate can be varied. The larger the gap, the less shear is effected. In this variation on Example 3, the gap size was 0.004 inches and the material was fed at 5.5 pounds per minute. Colloid mill processing may be more preferred for preparation of beverages using vegetable matter as a base, as the material tends to be worked and softened more with use of a colloid mill.

3c.

Another possibility for imparting a desirable texture to the product would be to sparge it with nitrogen. This step results in a fluffy texture.

3d.

As other alternatives, a colloid mill, press, homogenizer or the like could be used to expel water from the vegetable paste.

It should be understood that various modifications within the scope of this invention can be made by one of ordinary skill in the art without departing from the spirit thereof. We therefore wish our invention to be defined by the scope of the appended claims as broadly as the prior art will permit, and in view of this specification if need be.

We claim:

1. A creamy food composition comprising pumpkin vegetable matter as a base, oil, rice starch and gums, wherein said pumpkin comprises up to 78%, said oil comprises from 10% to 20%, said rice starch comprises from 1% to 3%, and said gums comprise up to 0.5% of said composition, wherein said creamy food is selected from the group consisting of spreads, dips, dressings, sauces, marinades, vegetable toppings, pates, beverages and soup enhancers, and wherein said creamy food is stored in a form selected from the group consisting of refrigerated, frozen, and shelf-stable.

2. The creamy food according to claim 1, wherein said vegetable matter is in a form selected from the group consisting of natural vegetable form, puree, and powder.

3. A mayonnaise substitute composition comprising pumpkin vegetable matter as a base, oil, rice starch, and gums, wherein said pumpkin vegetable matter comprises up to 78%, said oil comprises from 10% to 20%, said starch comprises from 1% to 3%, and said gums comprise up to 0.5% of said composition, and wherein said mayonnaise substitute is stored in a form selected from the group consisting of refrigerated, frozen, and shelf-stable and wherein said pumpkin vegetable matter is selected from the group consisting of natural pumpkin vegetable form, puree, or powder.

4. A pumpkin based condiment composition comprising pumpkin vegetable matter, rice starch, gums and oil, wherein said pumpkin vegetable matter comprises up to 78%, said rice starch comprises from 1% to 3%, said gums comprise up to 0.5%, and said oil comprises from 10% to 20% of said composition, and wherein said pumpkin based condiment is stored in a form selected from the group consisting of refrigerated, frozen, and shelf-stable.

5. The composition according to claim 4, further comprising one or more vegetables selected from the group consisting of squash, cucumber, zucchini, pepper, tomato, potato, beans, onions, and lettuce.

6. The composition according to claim 4, wherein said vegetable matter is in a form selected from the group consisting of natural vegetable form, puree, and powder.

7. A process for producing a pumpkin based condiment composition comprising combining components comprising pumpkin vegetable matter, oil, rice starch, and gums, wherein said pumpkin vegetable matter comprises up to 78%, said oil comprises from 10% to 20%, said rice starch comprises from 1% to 3%, and said gums comprise up to 0.5% of said composition, releasing water from said pumpkin vegetable matter in a kettle, colloid mill, press, or homogenizer, so as to evenly hydrate all components, wherein said pumpkin vegetable matter is added first among other components, and adding water, wherein said addition of water is in stages.

8. The process according to claim 7, wherein said components are processed in a kettle with continuous recirculation.

9. The process according to claim 7, wherein said pumpkin vegetable matter is in a form selected from the group consisting of natural pumpkin vegetable form, puree, and powder.

* * * * *